United States Patent [19]
Fujita et al.

[11] Patent Number: 5,917,496
[45] Date of Patent: *Jun. 29, 1999

[54] SPECIAL PURPOSE MEMORY FOR GRAPHICS AND DISPLAY APPARATUS USING THE SAME

[75] Inventors: Ryo Fujita, Tokai-mura; Mitsuru Soga; Yasushi Fukunaga, both of Hitachi; Takehiko Nishida, Hitachinaka, all of Japan

[73] Assignee: Hitachi, Ltd., Tokyo, Japan

[ * ] Notice: This patent is subject to a terminal disclaimer.

[21] Appl. No.: 09/059,397

[22] Filed: Apr. 14, 1998

Related U.S. Application Data

[63] Continuation of application No. 08/425,514, Apr. 20, 1995.

[30] Foreign Application Priority Data

Apr. 22, 1994 [JP] Japan .................................. 6-84328

[51] Int. Cl.$^6$ .................................................. G06T 15/00
[52] U.S. Cl. ...................... 345/422; 345/502; 345/503; 345/506; 345/509; 345/515; 345/518
[58] Field of Search ............................... 345/418, 420–1, 345/432, 435, 501, 507

[56] References Cited

U.S. PATENT DOCUMENTS

| | | | |
|---|---|---|---|
| 4,876,663 | 10/1989 | McCord | 364/900 |
| 4,994,901 | 2/1991 | Parulski et al. | 358/76 |
| 5,201,037 | 4/1993 | Kohiyama et al. | 395/164 |
| 5,353,403 | 10/1994 | Kohiyama et al. | 395/164 |
| 5,388,206 | 2/1995 | Poulton et al. | 395/505 |
| 5,408,606 | 4/1995 | Eckart | 345/572 |
| 5,724,067 | 3/1998 | Atchely et al. | 345/141 |
| 5,774,133 | 6/1998 | Neave et al. | 345/505 |

OTHER PUBLICATIONS

Computer Graphics Proceedings, Annual Conference Series, 1994, *FBRAM: A new Form of memory Optimized for 3D Graphics*, Michael F. Deering et al.

Poulton, et al.: *Breaking the Frame–Buffer Bottleneck with Logic–Enhanced Memories*, IEEE Computer Graphics and Applications Magazine, v. 12, N. 6, Nov. 1992, pp. 65–74.

*Primary Examiner*—Mark R. Powell
*Attorney, Agent, or Firm*—Kenyon & Kenyon

[57] ABSTRACT

The present invention relates to a three-dimensional graphic display apparatus for performing a hidden surface removal and color blending, and particularly to a configuration of a special purpose memory for graphics and a configuration of a graphic display apparatus using the special purpose memory. The special purpose memory for graphics according to the present invention comprises a memory cell for holding intensity information (RGB) and window information about each pixel therein, an XY coordinate converter for converting XY coordinates of a pixel to be written to a memory address, an intensity blending processor, and hidden-surface removal and window comparators, all of which are formed on the same chip.

5 Claims, 7 Drawing Sheets

FIG. 4

| MOD | SIGNIFICANCE | MOD | SIGNIFICANCE |
|---|---|---|---|
| 0000 | X, Y COORDINATES | 1000 | X, Y COORDINATES, STARTUP |
| 0001 | A, R, G, B | 1001 | A, R, G, B, STARTUP |
| 0010 | WID, OVL | 1010 | WID, OVL, STARTUP |
| 0011 | Z | 1011 | Z, STARTUP |
| 0100 | — | 1100 | — |
| 0101 | — | 1101 | — |
| 0110 | — | 1110 | — |
| 0111 | INTERNAL REGISTER ADDRESS | 1111 | INTERNAL REGISTER DATA |

FIG. 5

| DESIGNATION | | NUMBER OF BITS | CONTENTS |
|---|---|---|---|
| COMMON | RESET | 0 | INITIALIZE INTERNAL STATE |
| | NOP | 0 | NO OPERATION. USE FOR SYNCHRONIZATION OF ACCESS TO A PLURALITY OF MEMORIES |
| | CONFG | 10 | SPECIFY BIT CONFIGURATION OF SCREEN SIZE, ONE PIXEL AND CONFIGURATION OF MEMORY SPECIFY THE NUMBER OF MEMORIES EXTENDING IN X AND Y DIRECTIONS |
| | STATUS | 16 | READ INTERNAL STATE OF MEMORY |
| DRAWING SYSTEM | WT_FUNC | 5 | SPECIFY WRITE FUNCTION. ABLE TO SELECT LOGICAL OPERATION, ADDITION/SUBTRACTION, MIN/MAX |
| | BLEND | 6 | SPECIFY α BLEND METHOD |
| | Z_CMP | 4 | SPECIFY Z COMPARISON |
| | WID_CMP | 1 | SPECIFY WID COMPARISON |
| | PL_MASK_AC | 32 | SPECIFY PLANE WRITE MASK FOR INTENSITY, BLEND COEFFICIENT |
| | PL_MASK_WO | 8 | SPECIFY PLANE WRITE MASK FOR WID, OVL |
| | PL_MASK_Z | 32 | SPECIFY PLANE WRITE MASK FOR Z COORDINATE |
| | BUF_SEL | 1 | SELECT WRITE BUFFER FROM DOUBLE BUFFERS |
| DISPLAY SYSTEM | HBLANK | 8 | HORIZONTAL BLANKING PERIOD |
| | VBLANK | 6 | VERTICAL BLANKING PERIOD |
| | BUF_LUT | 16 | SPECIFY DISPLAY BUFFER BASED ON WID |

SPECIAL PURPOSE MEMORY FOR GRAPHICS AND DISPLAY APPARATUS USING THE SAME

This is a continuation of application Ser. No. 08/425,514 filed Apr. 20, 1995.

BACKGROUND OF THE INVENTION

The present invention relates to a three-dimensional graphic display apparatus for performing a hidden surface removal and color blending, and particularly to a configuration of a special purpose memory for graphics and a configuration of a graphic display apparatus using the special purpose memory for graphics.

A conventional memory for graphics comprises a normal dynamic RAM and a serial buffer as disclosed in Japanese Laid-Open Patent Application No. 59-131979 and U.S. patent application Ser. No. 427,236, now U.S. Pat. No. 4,562,435. According to the disclosure, a first port capable of providing a random access and a second port capable of reading display data are of substantially independently accessible memories, which were able to make a great increase in performance of both the random access and the reading of the display data as compared with the normal dynamic RAM.

As shown in FIG. 3, a three-dimensional graphic display apparatus using the conventional memory for graphics comprises: a drawing processor 300 including a pixel generator 301 for developing information about a straight line and a triangle supplied from a CPU 200 into pixel information, a memory controller 302 for converting XY coordinates of the developed pixel to an address in a special purpose memory 600, comparing the result of blending of an intensity of the developed pixel with intensities of pixels stored in the special purpose memory 600 and a Z coordinate, performing a hidden-surface removal for displaying preceding pixels for every pixel based on a result of comparing a Z coordinate, performing a WIND (Window Identify) comparison for controlling writing, and performing memory control for controlling reading of the information from the special purpose memory 600 when the information is determined and writing of the information into the special purpose memory 600 in accordance with the determined address, intensity, Z coordinate and the absence or presence of writing, and a serial buffer controller 303 for generating a signal for controlling display data sent to a RAMDAC, so as to be supplied to a serial buffer 602 of the special purpose memory 600; and the special purpose memory 600 including a memory cell 601 for holding pixel information comprised of intensity information, Z coordinate information and window information therein and the serial buffer 602 holding pixel data for display therein.

When it is desired to improve the performance of writing the pixel data into the special purpose memory, the prior art has increased the number of data signal lines or conductors between the drawing processor and the special purpose memory. However, when one attempts to realize the drawing processor and the special purpose memory in the form of an LSI, a problem arises that limitations are imposed on the number of the signal conductors.

Further, a problem arises when the screen is smoothly switched from one screen to another by separating a rewrite special purpose memory and a display special purpose memory from each other in a state in which a plurality of images to be displayed are being stored in the memory cell of the special purpose memory. When it is desired to realize a double buffer function for selecting one image for each pixel, it is necessary to output or generate a serial buffer's output corresponding to a plurality of pixels from the special purpose memory and the number of signal conductors used for the special purpose memory increases.

SUMMARY OF THE INVENTION

The present invention relates to a special purpose memory including a memory cell for holding intensity information and window information about each pixel therein and means for comparing window information about a pixel to be written and the window information about the corresponding pixel, which is held in the memory cell and determining, based on the result of the comparison, whether the pixel to be written should be written into the memory cell. The elements of the special purpose memory are provided on the same chip.

The present invention also relates to a special purpose memory including a memory cell for holding intensity information and depth information about each pixel therein and hidden surface removal means for comparing depth information about a pixel to be written and the depth information about the corresponding pixel, which is held in the memory cell and determining, based on the result of the comparison, whether the pixel to be written should be written into the memory cell. The elements of the special purpose memory are provided on the same chip.

Further, the present invention provides a special purpose memory for graphics comprising a memory cell for holding intensity information and window information about a pixel therein and a serial buffer for reading a plurality of pixels from the memory cell and successively outputting the read pixels to the outside, characterized in that double buffer control means for selecting desired intensity information from a plurality of pieces of intensity information on the same coordinates, which have been read from the serial buffer, based on window information read by the serial buffer, and outputting the selected desired intensity information therefrom, is provided on the same chip.

Furthermore, the present invention provides an image display apparatus comprising a CPU for generating coordinates and intensities of vertexes of graphics or segments, at least one drawing processor for generating information about pixels provided inside the graphics or information about pixels on the segments, at least one special purpose memory for storing pixel information generated from the drawing processor therein, and a display for displaying information stored in the special purpose memory on the screen, characterized in that a memory cell for holding intensity information and window information corresponding to the pixel information therein and means for comparing window information about a pixel to be written and the window information about the corresponding pixel, which is held in the memory cell, and determining whether the pixel to be written should be written into the memory cell, are incorporated into the special purpose memory.

As the pixels generated from the drawing processor, XY coordinates, a Z coordinate and intensity (RIB) are basically used. There is a case where window information, blend information, etc., are provided in addition to those.

According to the present invention, the window information held in the memory cell corresponding to the pixel to be written is read within the special purpose memory for graphics LSI and the read window information is compared with the window information about the pixel to be written. It is thereafter determined based on the result of comparison whether or not the pixel to be written should be written into the memory cell.

According to the present invention as well, the depth information held in the memory cell corresponding to the pixel to be written is read within the special purpose memory for graphics LSI and the read depth information is compared with the depth information about the pixel to be written. It is thereafter determined based on the result of comparison whether or not the pixel to be written should be written into the memory cell (the hidden surface removal processing is executed).

Thus, since the processes such as the pixel reading, pixel comparison, pixel writing, etc., are executed on the special purpose memory side, the amount of information supplied to the special purpose memory from the drawing processor can be cut in half. Since access times to the inside of the memory LSI are faster than access times to the outside thereof, the processing can be carried out at a high speed. Further, since a large quantity of pixel information can be read from and written into the memory cell in the LSI at a time, many pixels read at a time can be effectively used and processed.

Further, according to the present invention, since the desired intensity information is selected within the special purpose memory LSI from the plurality of pieces of intensity information on the same coordinates, which have been read from the serial buffer, based on the window information read from the serial buffer and is outputted as display data, the number of display output lines or conductors from the special purpose memory can be set to one piece of intensity information.

BRIEF DESCRIPTION OF THE DRAWINGS

The above and other objects, features and advantages of the present invention will become apparent from the following description and appended claims, taken in conjunction with the accompanying drawings in which:

FIG. 4 is a view for describing the significance of a mode signal MOD employed in the special purpose memory for graphics shown in FIG. 1;

FIG. 5 is a view for explaining the contents of a register provided inside the special purpose memory for graphics shown in FIG. 1;

DETAILED DESCRIPTION

One embodiment of the present invention will hereinafter be described with reference to the accompanying drawings.

Figure 1:
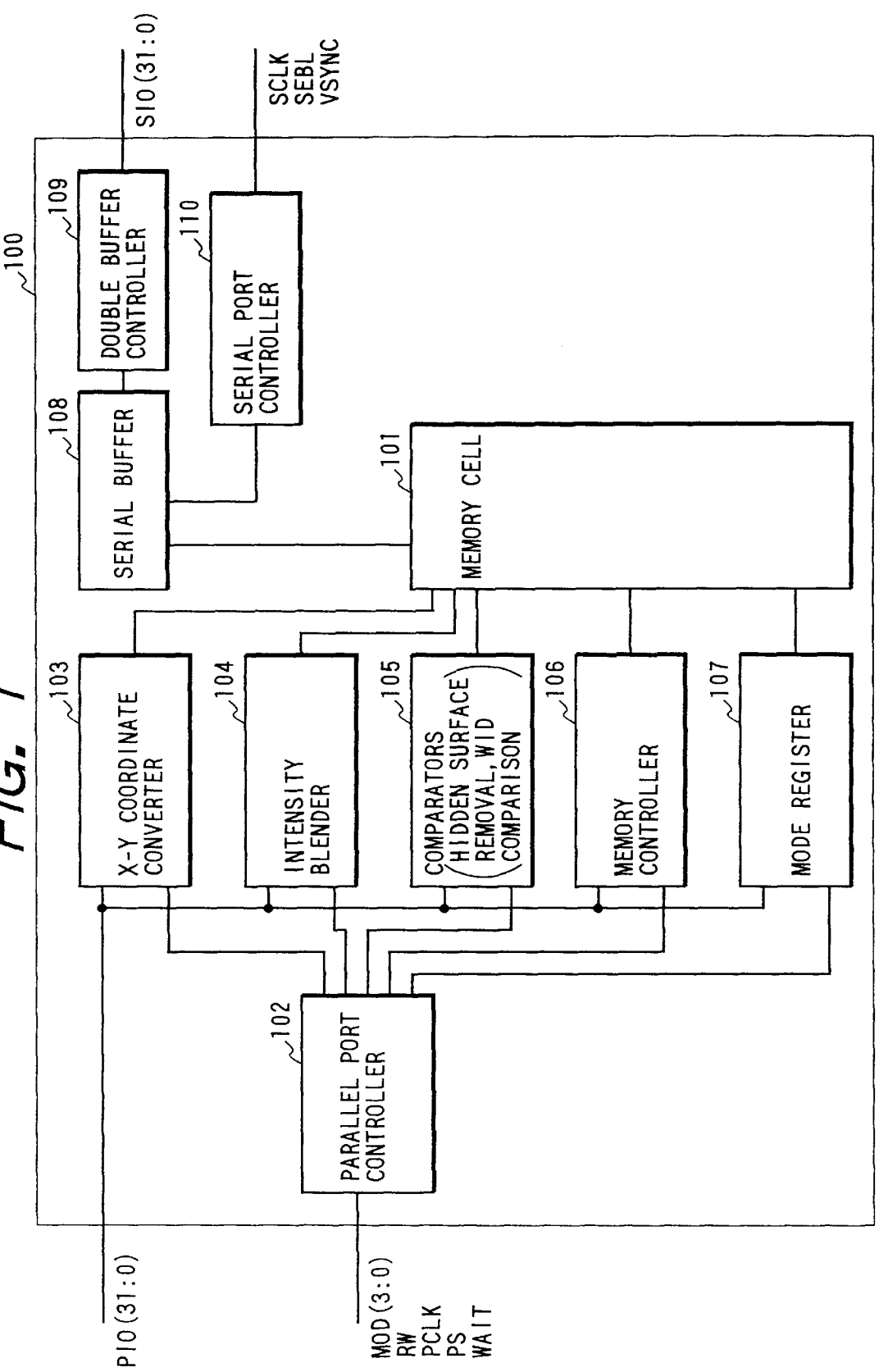
FIG. 1 is a block diagram showing an internal structure of a special purpose memory for graphics LSI according to one embodiment of the present invention.

FIG. 1 is a block diagram showing an internal structure of a special purpose memory for graphics 100 (hereinafter called simply "special purpose memory"). The special purpose memory 100 comprises a parallel port controller 102 for receiving a 4-bit mode signal MOD, a read/write signal RW, a parallel port clock signal PCLK and a chip select signal PS therein, generating timing signals so as to be supplied to the inside of the special purpose memory 100 and outputting a signal WAIT indicative of access wait therefrom, an X–Y coordinate converter 103 for converting an X–Y coordinate given by a data signal PIO to an address in a memory cell 101 in accordance with a screen size and a bit length of each pixel stored in a mode register 107, a luminance or intensity blender 104 for blending a luminance or brightness of each pixel and an intensity or luminance of a blend coefficient both already stored in the memory cell 101 with each other in accordance with brightness information and the blend coefficient given by a data signal PIO, a plurality of comparators 105 for comparing depth information (Z coordinate) given by a data signal PIO and depth information already stored in the memory cell 101 to thereby perform a hidden-surface removal for deciding whether or not writing should be conducted and for comparing window information given by a data signal PIO and window information already stored in the memory cell 101 to thereby perform a WID comparison for deciding whether or not writing should be conducted, a memory controller 106 for generating a control signal so as to be supplied to the memory cell 101, based on an image memory access request supplied from the parallel port controller 102, a memory read request for display, which is supplied from a serial port controller 110 and a memory refresh request, a mode register 107 which serves as a register for designating or specifying a screen size (defined by the maximum value and the minimum value of the X and Y coordinates, for example), a bit length of each pixel and a mode of a memory configuration, a serial buffer 108 for storing therein display data read from the memory cell 101, a double buffer controller 109 for selecting one of a plurality of pieces of brightness information on the same coordinates, which are read from the serial buffer 108, in accordance with the window information read from the serial buffer 108 together with the brightness information and outputting the selected one therefrom, and the serial port controller 110 for generating timing for reading display data into the serial buffer 108 in synchronism with a vertical synchronized signal supplied from the outside and for generating control signals for successively brining data outputted from the serial buffer 108 up to date, in accordance with a clock SCLK inputted to a serial port.

Figure 2:
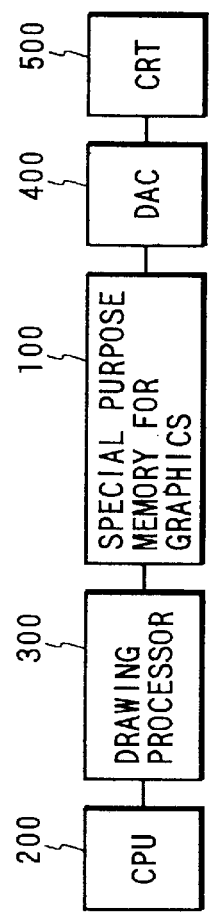
FIG. 2 is a view illustrating an outline of a display system using the special purpose memory for graphics LSI shown in FIG. 1.
Figure 3:
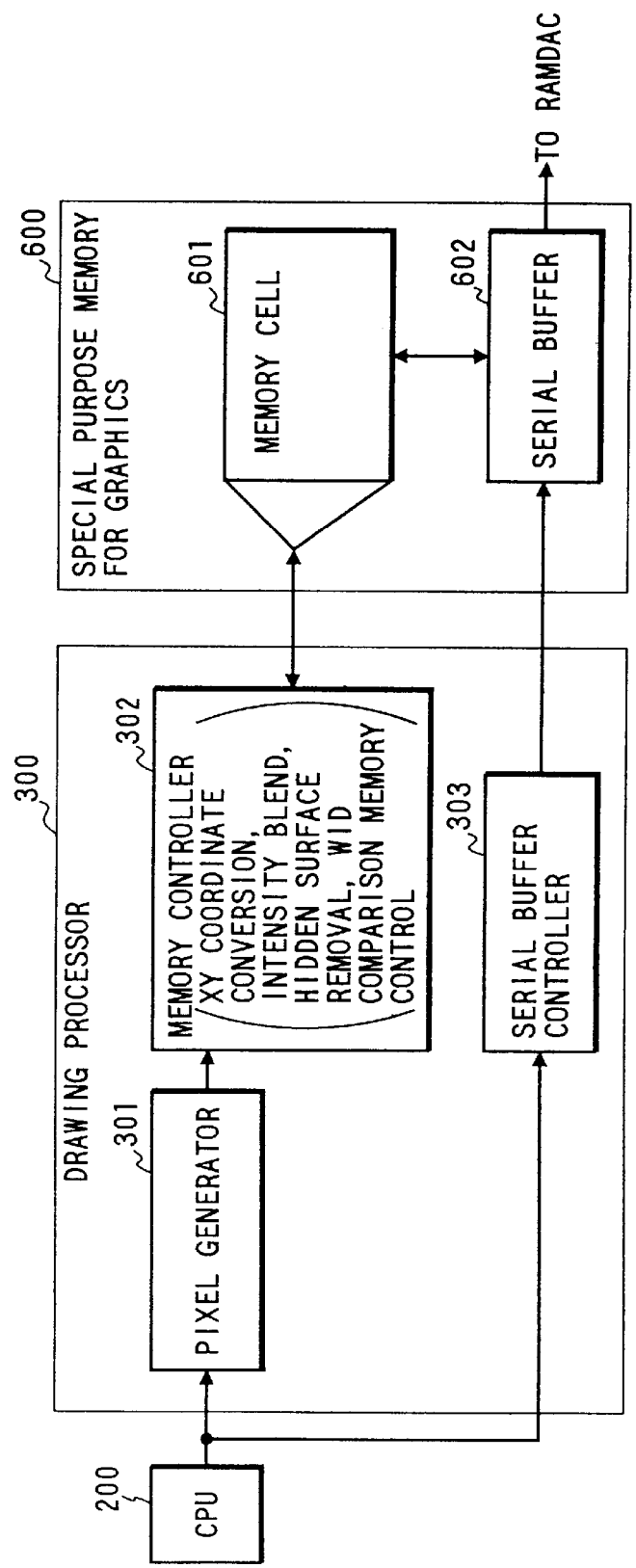
FIG. 3 is a view depicting the structure of a three-dimensional display apparatus using a conventional an image memory.

FIG. 2 is a view showing an outline of a graphic display system using the special purpose memory 100. The graphic display system comprises a CPU 200 for generating coordinates and intensities or brightness at vertexes of graphics (a triangle will be described below by way of illustrative example) and segments (a straight line will be described below by way of illustrative example), a drawing processor 300 for generating pixels provided inside the triangle and pixels on the straight line from information about the triangle and the straight line, the special purpose memory for graphics 100 for effecting a hidden-surface removal, brightness blending, etc. on pixels generated by the drawing processor 300 and blending intensity generated therefrom so a to store them in an internal memory cell, a converter DAC 400 for converting digital display data normally read from the special purpose memory 100 into an analog video signal, and a CRT 500 for generating an image from the video signal so as to be displayed on a tube screen.

The operation of the special purpose memory will now be described with reference to FIGS. 1 and 2.

The CPU 200 first executes an application program as described above to generate XYZ coordinates of vertexes of a triangle and a straight line and intensities (R, G and B). The generated information is supplied to the drawing processor 300, which generates information about pixels provided inside the triangle and information about pixels on the straight line. Pixel information comprised of the XYZ coordinates, the luminances or intensities (R, G, and B), etc. (pixel window numbers, blend coefficients and overlay are known as others herein) are written into the special purpose memory 100 by the drawing processor 300 when the access wait signal WAT is not asserted.

When the number of signal lines or conductors for the data signals PIO inputted to the special purpose memory 100 is set as 32 bits at this time, the amount of information per each pixel is of 90 bits or more (respective 11 bits for X and Y coordinates, 24 bits for intensity information, 32 bits for Z coordinate, etc.) and hence the amount of information increases. Therefore, the parallel port controller 102 writes information about the X and Y coordinates, the intensity, the Z coordinate, etc. in that order in synchronism with the parallel port clock signal PCLK in response to the instruction of the mode signal MOD. If the mode signal MOD indicates the X and Y coordinates when the chip select signal PS and the read/write signal RW are placed on the write side upon the access wait signal WAIT being negated, then the parallel port controller 102 writes data on the data signal PIO into the XY coordinate converter 103. Similarly, the intensity and the blend coefficient are written into the intensity blender 104 in accordance with the instruction of the mode signal MOD, the Z coordinate information and the window information are written into the comparators 105 in accordance with the instruction of the mode signal MOD, and the screen size, the bit length of each pixel, etc. are written into the mode register 107 in accordance with the instruction of the mode signal MOD. At this time, the mode signal MOD includes a pixel write execution start state. If the pixel write execution start state does not take place, then the supplied pixel information is simply taken in the register provided inside the special purpose memory as described above. If the pixel write execution start state is produced, then the memory controller 106 writes data into the memory cell 101 based on the already-set pixel information and other information (screen size and bit length of each pixel) in the following manner.

First of all, the XY coordinate converter 103 converts the given X and Y coordinates to the address in the memory cell 101. Described specifically, the result of conversion is determined by multiplication of a transverse width of a screen size, a bit length of each pixel and a Y coordinate and addition of an X coordinate to the result of multiplication.

Next, a normal dynamic memory has a large buffer corresponding to one row, which is provided thereinside, and takes or receives therein data corresponding to one row including pixels accessed to the buffer. When pixels to be written from now have been already included in the stored buffer corresponding to one row, this operation is not performed. This operation is controlled by the memory controller 106 based on memory-cell address information outputted from the XY coordinate converter 103. Next, the intensity blender 104 creates new intensity and blend coefficient calculated based on the intensity information and the blend coefficient on the one-row buffer. The calculation of these is carried out by a combination of an arithmetic operation such as multiplication, addition/subtraction, the greatest and least common or the like, and a logical operation such as AND, EOR or the like. The way to combine them is set to the register provided inside the intensity blender 104 in advance.

Next, the Z-coordinate information and the window information are received by the comparators 105 where they are respectively compared with Z-coordinate information and window information supplied from the parallel port side. The result of comparison is sent to the memory controller 106. The comparators 105 include a register for selecting a system for this comparison, e.g., whether or not writing should be conducted when the value of Z is large or whether or not writing should be conducted when the value of Z is small.

Next, when both a memory cell read request for display and a memory cell refresh request are not inputted, the memory controller 106 writes the determined intensity information and Z coordinate or the like into the one-row buffer. When the memory cell read request for display or the memory cell refresh request or a request for access to pixels that are not included in the one-row buffer is inputted, data stored in the one-row buffer is written back into the corresponding memory cell.

After the pixel information supplied from the parallel port has been subjected to the hidden-surface removal process and the intensity blending process, the so-processed pixel information is stored in the memory cell 101 in accordance with the above processing.

A description will now be made of the output of the display data and the control for refreshing the memory.

A basic clock signal dependent on a display device is first supplied as the serial port clock SCLK at all times. When the vertical synchronized signal VSYNC is asserted in synchronism with the basic clock signal, a display counter provided inside the serial port controller 110 is initialized so as to be successively brought up to date in synchronism with the clock SCLK. By decoding the value or count of the display counter, a request signal for transferring display data from the memory cell to the serial buffer 108 is sent to the memory controller 106. Since it is necessary to refresh all the contents in the memory for ten mseconds, a dynamic RAM sends a refresh request signal to the memory controller 106 so as to meet this need. Described specifically, the dynamic RAM refers to a register indicative of the screen size and the bit length of each pixel, which is provided in the mode register 107 and outputs the required minimum refresh request signal in accordance with the value counted based on the clock signal SCLK. The display counter can be normally used.

When the memory controller 106 receives the display data read request signal and the refresh request signal therein, the memory controller 106 rapidly completes a request for access from the parallel port to the memory cell and accepts requests in order of a refresh request and a display data read request. When the former or the refresh request is made, the memory controller 106 loads the memory cell with a value counted by a refresh counter provided inside the memory controller 106 as a refresh address and rapidly writes it back therein. When the latter or the display data read request is made, the memory controller 106 reads a display address sent from the serial port controller 110 and allows the serial buffer 108 to store it therein.

The display data stored in the serial buffer 108 has a plurality of pieces of intensity information, window information and overlay information per pixel. Next, the double buffer controller 109 selects one of the intensity information in accordance with the window information and outputs a data signal SIO therefrom. Described specifically, the double buffer controller 109 selects one intensity information by referring to a double buffer select register provided therein, which is indicative of which window selects any of intensity information.

FIG. 4 is a table showing the significance of the mode signal MOD inputted to the special purpose memory for graphics. The mode signal MOD indicates a 4-bit signal conductor or a signal conductor indicative of which data of meaning or significance should be set to a data signal PIO supplied to the parallel port or which data should be read, and has the significance shown in FIG. 4. Namely, when the three rightmost bits are 0, 1, 2 and 3, XY coordinates, intensity information (blend coefficients, RGB), other pixel information (window information, overlay information) and depth information (Z coordinate) are respectively set. When the most significant bit is 1, an access to the memory cell is actually obtained after the set pixel information has been established. When the MOD is of "0111", an address in one of internal registers is specified. On the other hand, when the MOD is of "1111", data is written into a register specified by the address in the internal register or data to be read is specified. When the MOD is other than those, the significance of MOD is represented as undefined.

Next, FIG. 5 is a table illustrating the contents of the internal registers. A RESET register is of a register that lacks material substance, for initializing an internal state of the special purpose memory. When an access to the register is obtained, the contents of an internal register are set to default values. At this time, the contents of the memory cell remain unchanged.

A CONFIG register sets a screen size, a bit line of each pixel and the number of memories extending in X and Y directions. Described specifically, each of 640×400 pixels, 1024×768 pixels, 1152×900 pixels, 1280×1024 pixels, 1600×1200 pixels and 1920×1035 pixels can be selected on a 3-bit basis as the screen size. Each of 8, 16, 32, 64, 96 and 128 per pixel can be selected on a 3-bit basis as the one-pixel bit length. As the number of the memories extending in the X and Y directions, each of 1, 2, 4 and 8 can be selected with the X and Y as 2 bits.

A STATUS register is of a read only register, which is used to read internal states. The internal states include a state of transition of logic for control of the contents and insides of the display counter and the refresh counter, etc. The STATUS register is principally used for debug and maintenance.

A WTFUNC register holds intensity information obtained by effecting a blend process on the set intensity information and information for selecting the contents of operation obtained when the target intensity information is calculated, and specifies the OR, the AND, the exclusive OR, addition, subtraction, greatest, least or the like of two variables on a 5 -bit basis.

A BLEND register is of a 6-bit register for specifying how the set intensity information is to be calculated together with a blend coefficient. The BLEND register selects any of 0, 1 and a blend coefficient (1—blend coefficient) by which the intensity information is multiplied (the intensity information set from the parallel port side and the already-stored pixel intensity information can be set and the blend coefficient needs 6 bits in total because it can be selected from the two kinds of intensity information referred to above).

A ZCMP is of a register capable of handling four bits in total which consist of one bit for specifying whether a comparison should be effected on the Z coordinate and three bits for specifying which comparison and operation should be conducted, in other words, for selecting any of =, =, *, *, > and <, for example.

A WIDCMP is of a one-bit register for specifying whether window information should be compared with others.

PLMASKAC, PLMASKWO and PLMASKZ are respectively of registers to specify plane masks for writing a blend coefficient and intensity information, window information and overlay information, and a Z coordinate into their corresponding buffers. 1 represents a write enable mask and 0 represents a write mask. Masks can be set every planes.

A BUFSEL is of a register for indicating which side of double buffers is selected by a pixel to be written from now or a read pixel. When the value of the register is 0, data is written into a "0" buffer, whereas data is written into a "1" buffer when the value thereof is 1.

An HBLANK represents a horizontal blanking period and is of a register for specifying when a data signal SIO starts to output display data according to the number of times in which the SCLK is input, provided that a falling cycle of a VSYNC signal is defined as reference.

A VBLANK represents a vertical blanking period and is of a register for specifying whether a display period starts during a period from the time when the VSYNC signal falls to the time when several rasters are produced. One raster represents a period obtained by adding the transverse width of a screen size and the horizontal blanking period set to the HBLANK register.

Next, a BUFLUT register is of a register for indicating a corresponding relationship between window information and a display buffer. When the window information is 4 bits, the BUFLUT register serves as a 16-bit register.

In the RESET register of the above registers, its internal state is initialized simultaneously with its writing process. The registers other than the RESET register exert an influence on the operation where the most significant bit of the mode signal MOD is 1 and an access request is made and since the vertical synchronized signal VSYNC was input. Namely, these registers are respectively constructed in two stages: a first stage corresponding to a register which can be freely set from the parallel port side; and a second stage corresponding to a register being employed in an under-present operating process. When the access request is made and the vertical synchronized signal VSYNC is input, data is transferred from the first stage to the second stage.

The summary and operation of the special purpose memory for graphics have been shown above. Methods applied to some graphic systems will now be described with reference to FIGS. 6, 7 and 8.

Figure 6:
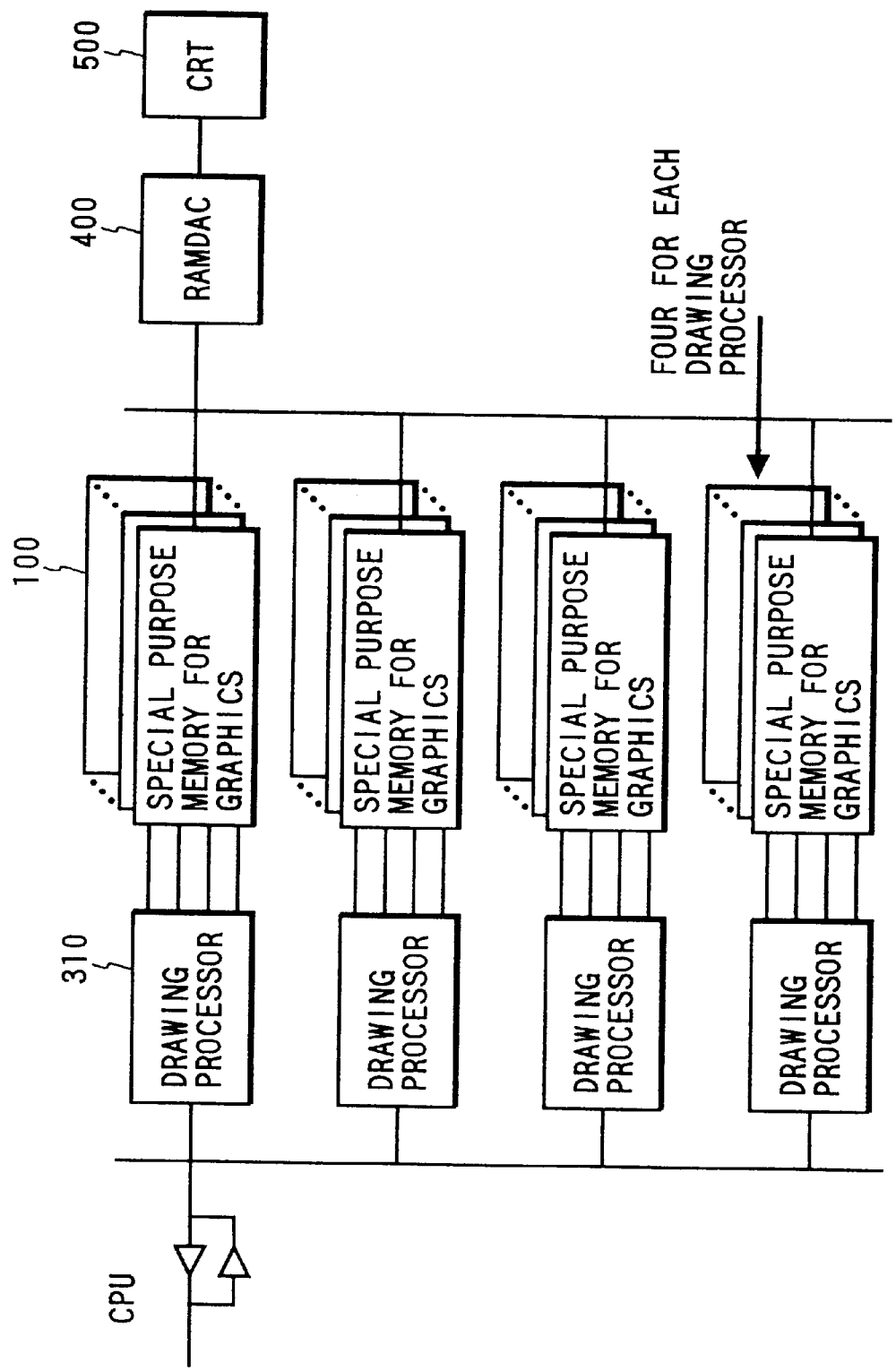
FIG. 6 is a view showing one example of the structure of the display system using the special purpose memory graphics LSI shown in FIG. 1.

FIG. 6 shows the structure of a system using a plurality of drawing processors 310 for realizing high performance and a plurality of special purpose memories for graphics 100. In FIG. 6, the number of the drawing processors 310 are four and the drawing processors 310 are provided for every rasters. The drawing processor 310 breaks down one drawing command such as a straight line or a triangle into pixels and performs a process for writing data into the corresponding special purpose memory for graphics 100. Four special purpose memories 100 are electrically connected to a single drawing processor 310 in a relationship of 1:1. The four special purpose memories can be independently accessed. One of the drawing processors supplies a vertical synchronized signal to other drawing processors and all the special purpose memories and supplies a vertical synchronized signal and a horizontal synchronized signal for RAMDAC to a RAMDAC. If display data is read from a memory cell when necessary by effecting the designation of both X and Y directions as four pixels and four rasters on a register indicative of a memory configuration of a CONFIG register provided within each special purpose memory under this construction, the corresponding special purpose memory can be accessed to the maximum from the parallel port.

Figure 7:
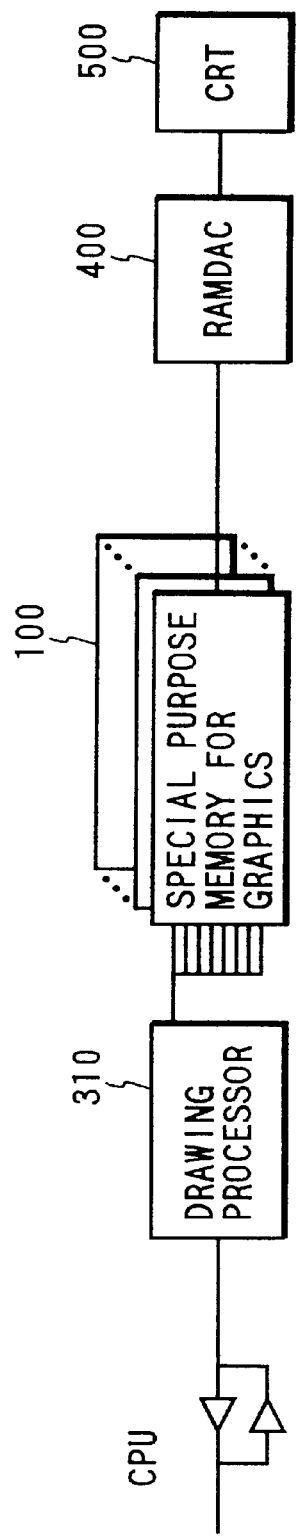
FIG. 7 is a view illustrating another example of the structure of the display system.

FIG. 7 shows the structure of a graphic system which provides high resolution but places emphasis on the cost. The present graphic system is of a type wherein a single drawing processor is provided whereas a plurality of special purpose memories for graphics are connected to the same bus. An access of each special purpose memory to a parallel port is performed by supplying a chip select signal PS from the drawing processor to individual special purpose memories. Further, a WAIT outputted from a special purpose memory to be accessed is selected and used as an access wait signal WAIT. Each of signals other than the chip select signal PS and the access wait signal WAIT can be commonly supplied to the special purpose memories. The drawing processor supplies a vertical synchronized signal VSYNC to all the special purpose memories. Further, the drawing processor also supplies a horizontal synchronized signal and the vertical synchronized signal to a RAMDAC.

Figure 8:
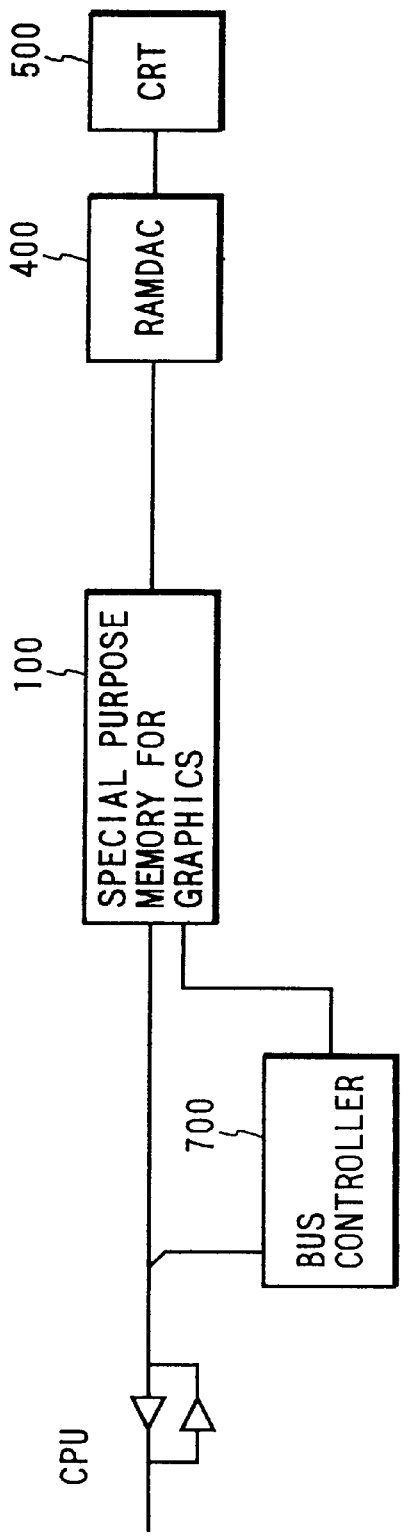
FIG. 8 is a view depicting a further example of the structure of the display system.

FIG. 8 illustrates the structure of a graphic system which provides the minimum cost. A bus controller 700 decodes a system bus for connecting a CPU and the graphic system to each other and obtains access to a special purpose memory for graphics. The bus controller 700 decodes an access address supplied from the CPU and sets it to a mode signal MOD and a chip select signal PS. Further, the bus controller 700 has access to the special purpose memory for graphics in synchronism with an access wait signal WAIT. Furthermore, the bus controller 700 supplies a vertical synchronized signal to the special purpose memory for graphics and also supplies horizontal and vertical synchronized signals to a RAMDAC.

Figure 9:
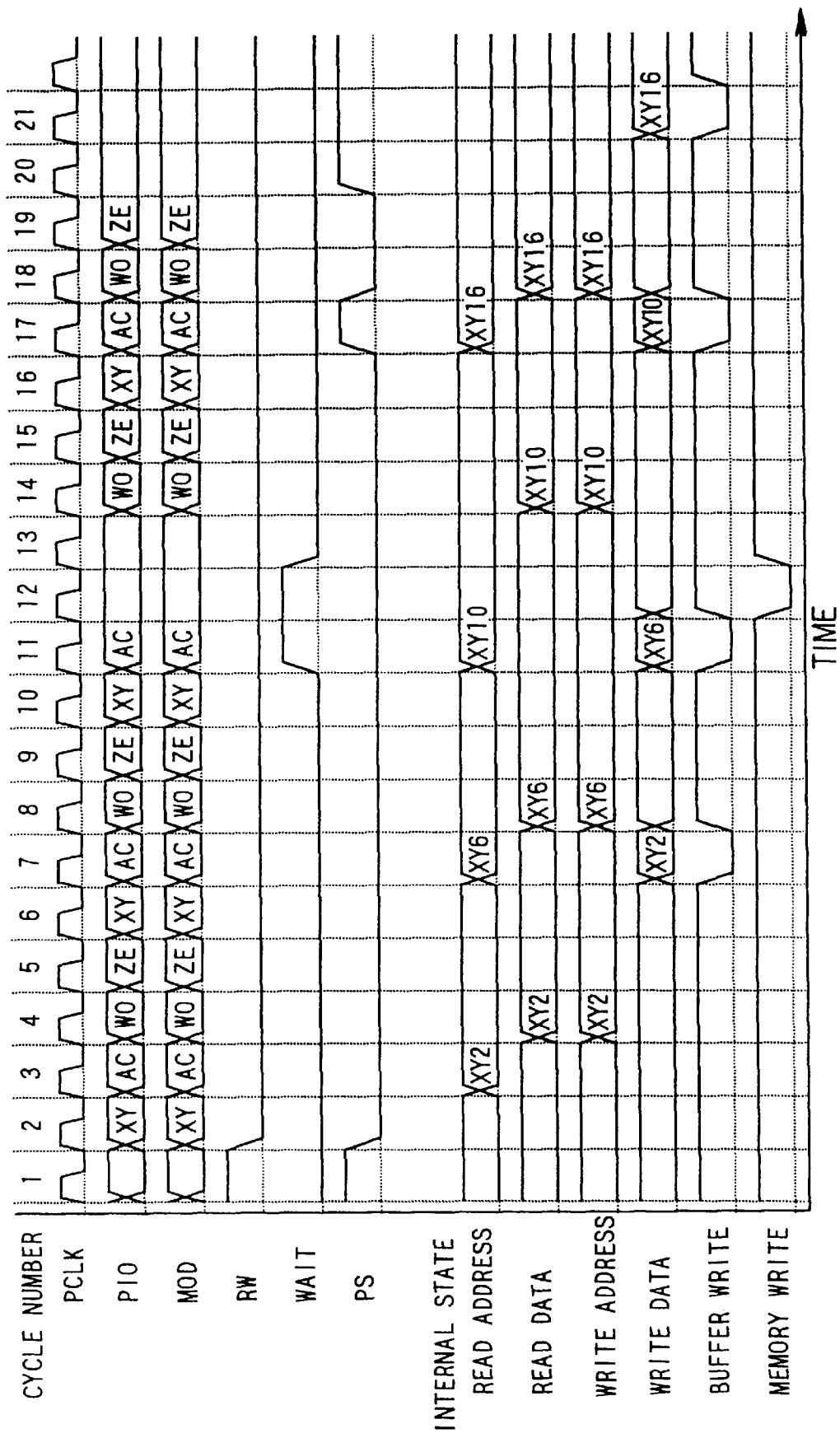
FIG. 9 is a view for describing a timing chart at the time of a parallel port access.

Finally, FIG. 9 shows a timing chart employed upon access to a parallel port.

From above the drawing, the following items are shown which are cycle numbers for describing the corresponding clocks; PCLK, PIO, MOD, RW, WAIT and PS indicative of interface signals at the parallel port; a read address, read data, a write address and write data indicative of internal states of each special purpose memory for graphics; a write control signal supplied to each internal buffer; and a write control signal of from the internal buffer to a memory cell.

A cycle 1 will be defined as a state in which a special purpose memory for graphics is in an idle state and is waiting for an access request.

When the MOD is defined as XY coordinates, the RW is defined as write, the chip select PS is selected and XY coordinate data is set to the data bus PIO, the XY coordinates are stored in a read address register provided within each special purpose memory for graphics.

During a cycle 3, a blend coefficient and intensity information (RGB) represented as AC in the drawing are set after the XY coordinates have been set, whereby they are stored in the corresponding buffers for the blend coefficient and the intensity in the special purpose memory for graphics. At the same time, the XY coordinates set during the cycle 2 are converted into row and column addresses in a memory cell. It is now judged whether or not the row address is identical to an address for the data read at present. If the answer is found to be NO, then the data read at present is written back into the original address and a newly-specified address data is read. If it is found that the row address is identical to the read data address, then data corresponding to one pixel is selected and used in accordance with the column address. During the cycle 3 shown in FIG. 9, the XY coordinates (XY2) are regarded as have been already read into the buffer in the special purpose memory for graphics.

During a cycle 4, window information and overlay information represented as WO in the drawing are set. On the other hand, the data read during the cycle 3 and the blend coefficient and intensity information set during the cycle 3 become valid or effective from the cycle 4 and hence blend processing is started. The blend processing varies in time until the result of blend processing is finished in accordance with a blend method set to a BLEND register. Therefore, a counter is provided which counts the number of cycles dependent on the blend processing method. When the blend coefficient and the intensity information are set and the read data becomes effective, the above counter is reset.

During a cycle 5, depth information Z represented as ZE in the drawing is set and a write startup is carried out. When a hidden-surface removal and blend processing are effected on the pixel information set until now and the writing of it into the corresponding memory cell is specified, the write startup sets an internal write flag.

During a cycle 6, XY coordinates indicative of the next pixel are given. The special purpose memory for graphics internally continues the blend processing and compares the Z coordinate set during the cycle 5 with a read Z coordinate to determine or judge whether data should be written into a memory cell.

During a cycle 7, a blend coefficient and intensity information associated with the pixel indicated by the XY coordinates set during the cycle 6 are given or set. Blend processing is finished within the special purpose memory for graphics and the pixel information subjected to the blend processing is read so that a buffer write signal to be written into a given row buffer is asserted. It is simultaneously judged whether or not the XY coordinates (XY6) set during the cycle 6 are identical in row address to the XY coordinates (XY2) set during the cycle 2.

Processes similar to those carried out during the cycles 4, 5, 6 and 7 are performed during cycles 8, 9, 10 and 11 so as to write a pixel subjected to blend processing and a hidden-surface removal into XY coordinates (XY6). Since, however, XY coordinates (XY10) are different in row address from the XY coordinates (XY6) during the cycle 11, a WAIT signal is first asserted to write back the contents of a row buffer being subjected to buffering at present into a memory cell and the next access is prevented from coming in.

During a cycle 12, the contents of a row buffer are written back into a memory cell by asserting a memory write signal. A WAIT signal is asserted till this cycle and the next access is prevented from coming in.

During a cycle 13, a process for reading row data of XY coordinates (XY10) into a corresponding row buffer is performed. A WAIT is cleared and the next access is enabled.

Subsequently to a cycle 14, processes each similar to the process carried out during the cycle 4 are successively performed. When a chip select signal PS is negated as indicated by the cycle 17, its cycle access becomes invalid. Therefore, a blend coefficient and intensity information set during the cycle 17 are not used and the blend coefficient and intensity information set during the cycle 13 are used as an alternative. Since a chip select signal PS is negated subsequently to a cycle 20, a mode signal MOD includes specification about a startup but cannot accept it. Thus, pixels are not drawn or plotted.

According to the embodiments illustrated above, the pixel information can be directly written into the corresponding special purpose memory for graphics through the XY coordinates by providing the register for setting the screen size and the bit length of each pixel and the XY coordinate converter 103. Thus, the load on each drawing processor for generating the high-order pixels can be lightened.

Since the intensity blend processor 104 and the comparators 105 are disposed within the special purpose memory for graphics, a throughput of data between each of the intensity blender 104 and the comparators 105 and the memory cell 101 can be greatly increased. Therefore, such a system can be activated at a high speed as compared with a system for reading data from a conventional memory and writing it therein.

Further, since each of the high-order drawing processors does not sense the display timing and the memory refresh cycle by providing the serial port controller 110 within the special purpose memory for graphics and outputting the access wait signal WAIT, the load on the drawing processor can be reduced. This can bring about an effect that the graphic system becomes simple in structure particularly when the high-order drawing processor is of a CPU having no special display logic circuit.

Furthermore, since the plurality of pieces of pixel information are not outputted from the special purpose memory for graphics owing to the provision of the double buffer controller 109, the number of input signal conductors can be reduced.

Having now fully described the invention, it will be apparent to those skilled in the art that many changes and modifications can be made without departing from the spirit or scope of the invention as set forth herein.

What is claimed is:

1. A special purpose memory for graphics LSI comprising:

a memory cell for holding intensity information and depth information about a plurality of pixels;

a data input port receiving data;

a coordinate converter for converting said data given from said data input port into an address in said memory cell;

an intensity blender for creating an intensity information calculated based on intensity information read from said memory cell based on said address;

a comparator for comparing said data given from said data input port and depth information read from said memory cell based on said address; and a controller for receiving a mode signal and for giving said data to one of said coordinate converter, said intensity blender and said comparator based on said mode signal.

2. The special purpose memory for graphics LSI as claimed in claim 1, further comprising a memory controller for writing said calculated intensity information and compared result by said comparator to said memory cell.

3. The special purpose memory for graphics LSI as claimed in claim 1, further comprising a register at least a size of a display screen and a bit length of each pixel.

4. The special purpose memory for graphics LSI as claimed in claim 3, wherein said coordinate converter for converting is based on said size of a display screen and said bit length of each pixel.

5. An image display apparatus comprising:

a CPU generating coordinates and intensities of vertexes of graphics or segments;

at least one drawing processor generating information about pixels corresponding to the graphics or information about pixels on the segments;

at least one special purpose graphics memory storing pixel information generated from said drawing processor; and a display displaying information stored in said special purpose memory on a screen;

said special purpose memory comprising:

a memory cell for holding intensity information and depth information about a plurality of pixels;

a data input port receiving said information;

a coordinate converter for converting said data given from said data input port into an address in said memory cell;

an intensity blender for creating an intensity information calculated based on intensity information read from said memory cell based on said address;

a comparator for comparing said data given from said data input port and depth information read from said memory cell based on said address; and a controller for receiving a mode signal and for giving said data to one of said coordinate converter, said intensity blender and said comparator based on said mode signal.

* * * * *

UNITED STATES PATENT AND TRADEMARK OFFICE
CERTIFICATE OF CORRECTION

PATENT NO. : 5,917,496
DATED : June 29, 1999
INVENTOR(S) : Ryo Fujita, et al.

It is certified that error appears in the above-identified patent and that said Letters Patent is hereby corrected as shown below:

| Column | Line | |
|---|---|---|
| 3 | 45 | After "conventional" delete "an". |
| 4 | 47 | Change "brining" to --bringing--. |
| 4 | 63 | Change "a" (1st. occurrence) to --as--. |
| 8 | 12 | Change "planes" to --plane--. |
| 8 | 57 | Change "rasters" to --raster--. |
| 9 | 47 | Before "from" delete "of". |
| 10 | 5 | Change "have" to --having--. |

Signed and Sealed this

Thirteenth Day of June, 2000

Attest:

Attesting Officer

Q. TODD DICKINSON

Director of Patents and Trademarks